United States Patent [19]

Lilley

[11] 4,351,395
[45] Sep. 28, 1982

[54] LAWN EDGER AND TRIMMER

[76] Inventor: George S. Lilley, 101 E. Pierson Ave., Somers Point, N.J. 08244

[21] Appl. No.: 183,645

[22] Filed: Sep. 3, 1980

[51] Int. Cl.³ .............................. A01G 3/06; A01B 1/12
[52] U.S. Cl. ..................................... 172/13; 172/371; 30/DIG. 5
[58] Field of Search ...................... 172/13, 14, 17, 18; 30/294, DIG. 5; 172/171, 172, 371, 375, 381, 15, 16

[56] References Cited

U.S. PATENT DOCUMENTS

| | | | |
|---|---|---|---|
| 903,085 | 11/1908 | Heather | 172/13 |
| 1,263,779 | 4/1918 | Lentz | 172/13 |
| 1,331,750 | 2/1920 | Fulton | 172/13 |
| 1,454,018 | 5/1923 | Lees | 172/18 |
| 2,133,208 | 10/1938 | Nellis | 172/13 |
| 2,743,658 | 5/1956 | Wynstra | 172/13 |
| 2,753,785 | 7/1956 | Zenk | 172/13 |
| 2,899,001 | 8/1959 | Paris | 172/13 |

*Primary Examiner*—Richard J. Johnson
*Attorney, Agent, or Firm*—Marvin S. Towsend

[57] ABSTRACT

A one-piece sidewalk edger and lawn trimmer is disclosed. The one-piece edger-trimmer may be attached to a hoe by removable clamping means. The combined edger-trimmer-hoe allows control of the depth of the groove which is made in the ground during the operation of the implement without the need for making a separate adjustment of the implement. The hoe portion scrapes the upper surface of the sidewalk and collects the cuttings which fall upon the sidewalk. A one-piece edger-trimmer-hoe is also disclosed.

6 Claims, 5 Drawing Figures

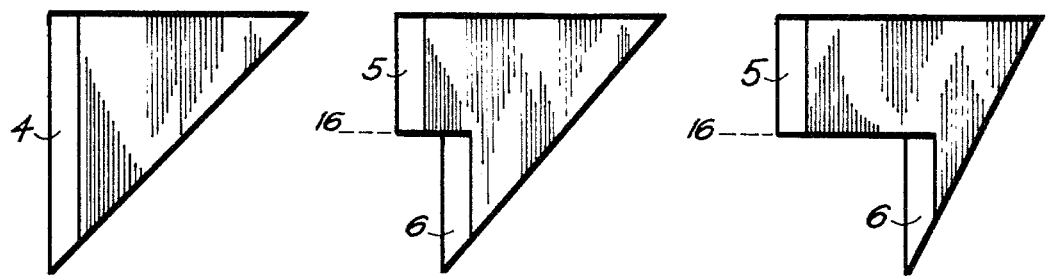
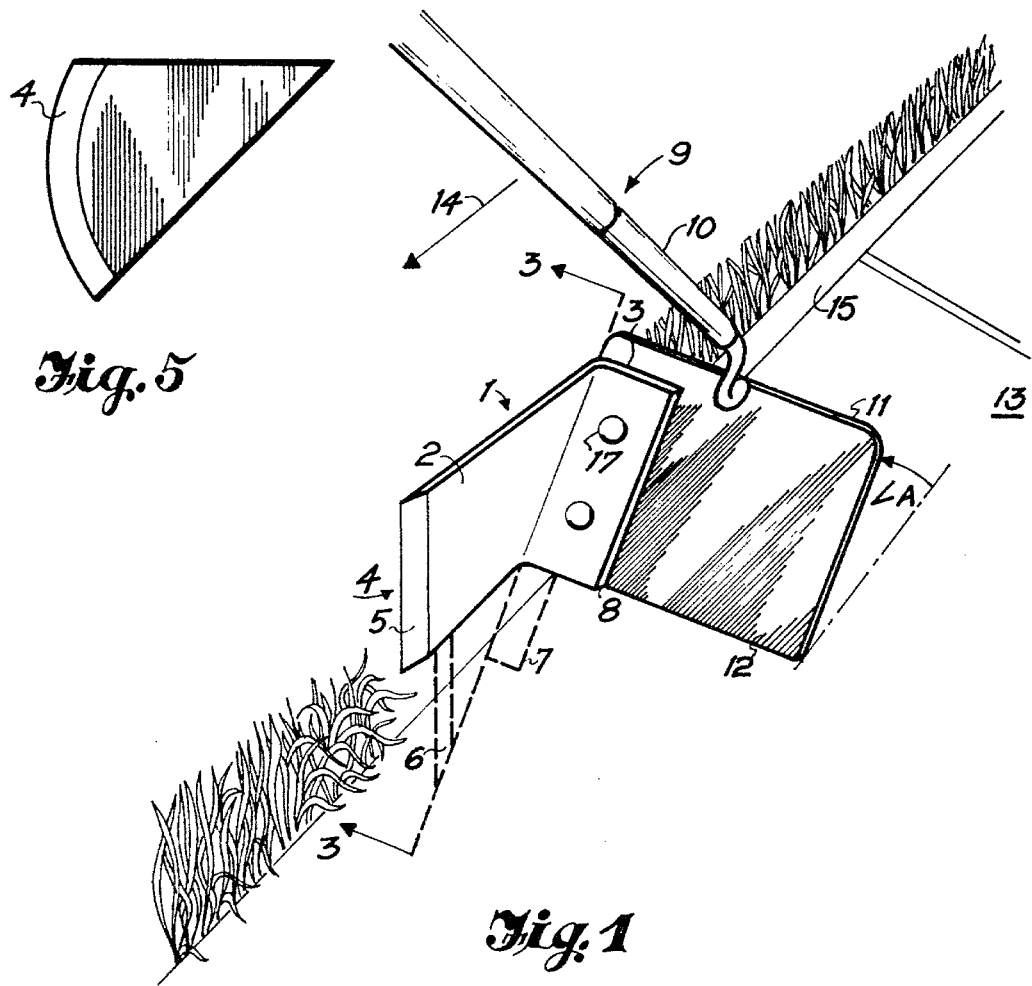

LAWN EDGER AND TRIMMER

TECHNICAL FIELD

The invention is in the area of implements used for trimming grass and providing a groove beside a sidewalk.

Background Art

A variety of implements are disclosed in the prior art for trimming and edging lawns adjacent to sidewalks. Some implements are pushed by the operator, and some are pulled. Of particular interest are those that are pulled. The action of pulling the implement is more easily controlled by the operator and is preferred.

Some implements have a wheel which rolls along the sidewalk. Others have a flat element which slides along the upper surface of the sidewalk. The latter type is preferred because it is inherently more stable and is easier to control.

Representative examples of patents in the prior art that disclose implements that are operated by a pulling action and have flat elements which slide on the upper surface of the sidewalk are the following U.S. Pat. Nos.: 1,331,750 of Fulton; 2,753,785 and Zenk; and 2,899,001 of Paris.

Some of the prior art patents disclose means for adjusting the depth of the groove that is made by the implement. However, in each case, in order to change the depth of the groove it is necessary to cease edging and trimming operations, loosen one or more nuts and bolts, make an adjustment, and retighten the nut and bolt. This method of changing the depth of the groove is disclosed in above-mentioned U.S. Pat. Nos. 2,753,785 and 2,899,001 and in U.S. Pat. No. 2,743,658 of Wynstra. No prior art teaches a way of adjusting the height or depth of the groove during the operation of the implement without stopping the operation and making an adjustment.

As cuttings are produced by the implement, it is desired to scoop them up as one goes along. The above-mentioned U.S. Pat. Nos. 1,331,750 and 2,753,785 provide scoops placed behind the groove maker. They do not, however, provide means for collecting the cuttings which fall upon the sidewalk. Furthermore, no patent discloses means for scraping the sidewalk as the cuttings are collected.

All the implements discussed above have handles firmly connected to the cutting tool without any disclosure of the desireability of being able to separate the cutting tool from the handle so as to be able to use the handle for other purposes with other implements. Furthermore, there is no disclosure of attaching the cutting tool as an attachable and removable attachment to another implement. The other implement could thusly be used either for its originally intended purpose or in combination with the attachment.

In view of the above, it is an object of the invention to provide a sidewalk edger and lawn trimmer having means for adjusting the depth of the grooved edge formed during the operation of the implement.

Another object of the invention is to provide an edger and trimmer that scrapes the upper surface of the sidewalk and collects the cuttings which fall upon the sidewalk.

Another object of the invention is to provide a one-piece attachment for a hoe which can easily be attached to or removed from the hoe.

These and other objects are accomplished by the invention as described below.

Disclosure of Invention

The invention is a one-piece sidewalk edger and lawn trimmer attachment for a hoe which is comprised of a vertical portion and an obliquely angled portion adjacent to the vertical portion. The vertical portion has two cutting edges; one for above ground level cutting and the other far below ground level cutting. The obliquely angled portion has a portion for making grooves and a portion for attaching to a hoe. The one-piece attachment may be bolted to or clamped to the hoe.

When the one-piece sidewalk edger and lawn trimmer attachment is attached to a hoe, a combined edger-trimmer-hoe implement results. The combined implement provides a number of advantages. Adjustment in the depth of the groove as the edging-trimming operation is in progress is made possible by merely changing the angle formed between the handle of the hoe and the sidewalk. The weight of the combined implement rests upon the lower edge of the hoe. By changing the angle between the handle and the sidewalk, the lower edge of the hoe acts as a fulcrum, and the edger-trimmer attachment is raised or lowered thereby allowing the depth of the groove to be altered without the need for stopping the operation and making a separate adjustment of the implement.

The lower edge of the hoe also serves another purpose. As the lower edge is moved across the upper surface of the sidewalk, it scrapes the sidewalk. In addition, the main portion of the hoe blade serves to collect cuttings that may have fallen onto the upper surface of the sidewalk.

As stated above, the edger-trimmer can be an attachment to a hoe which can easily be attached or removed thereby permitting the hoe to be used in the conventional manner or as a combination edger-trimmer-hoe. It is also contemplated that a one-piece edger-trimmer-hoe implement can be formed. The advantages of the hoe portion of the invention are attained whether the invention is in the form of an attachment to a hoe or in the form of a one-piece implement having a hoe portion.

Still other objects and advantages of the present invention will become readily apparent to those skilled in this art from the following detailed description when read in connection with the accompanying drawing. Although the description presented below relates especially to the embodiments of the invention disclosed in the drawing, the description is not intended to limit the scope of the invention which is defined in the claims.

BRIEF DESCRIPTION OF DRAWINGS

FIG. 1 shows one embodiment of the invention in a perspective view in operation.

FIGS. 2, 3, 4, and 5 show alternate configurations for the cutting blades.

BEST MODE FOR CARRYING OUT THE INVENTION

FIG. 1 shows one embodiment of the invention in a perspective view in operation. One-piece edger-trimmer 1 includes vertical cutting blade portion 2 and obliquely angled portion 3. Vertical portion 2 includes a cutting edge 4 having an above ground cutting edge portion 5 and a below ground cutting edge portion 6. Obliquely angled portion 3 is a downwardly and forwardly angled extension portion and is formed from the one-piece edger-trimmer 1 adjacent to and generally perpendicular to vertical portion 2. Obliquely angled portion includes a groove maker 7 and a hoe attachment portion 8. A hoe is shown generally at 9. The hoe includes handle 10 and hoe blade 11. Edger-trimmer 1 is attached to the hoe blade 11 by means of screws 17 or any other suitable securing means such as nuts and bolts and clamps. Lower edge 12 of hoe blade 11 rests upon the upper surface of sidewalk 13.

In operation, below ground cutting edge portion 6 and groove maker are formed into the ground at the edge of the sidewalk 13. The hoe 9 is held at any desired angle A with respect to the sidewalk by tilting the handle 10 using the lower edge 12 of hoe blade 11 as fulcrum. By tilting the hoe, the depth of groove maker 7 in the ground is controlled. In addition, the portions of cutting blade 4 which are above ground and below ground are altered. The hoe is pulled in the direction of directional arrow 14 which is toward the operator. As cuttings are produced by the action of the cutting edge 4 and groove maker 7, they fall upon sidewalk 13. Horizontal hoe blade 11 serves to collect the cuttings which fall upon the sidewalk. Furthermore, lower edge 12 of hoe blade 11 serves to scrape the sidewalk.

It is seen that the variation in the depth of the groove 15 formed by the groove maker 7 is easily controlled merely by tilting the handle in the course of the edger-trimmer operation. There is no need to cease operation, make an adjustment in the implement, and then continue operation.

By unscrewing screws 17 or by otherwise disconnecting one-piece edger-trimmer 1 from hoe blade 11, the hoe 9 can be used in the conventional manner as a hoe.

In an alternative embodiment of the invention, a one-piece edger-trimmer-hoe can be fabricated. In effect, the hoe attachment portion 8 of edger-trimmer 1 can be lenghtened so that it forms a hoe blade in and of itself.

In FIG. 3 a cross-section of edger-trimmer 1 taken along line 3—3 of FIG. 1 is shown wherein the above ground cutting edge 5 and below ground cutting edge 6 are clearly defined. At a predetermined angle A of tilt of the hoe, line 16 of demarcation between above ground cutting portion 5 and below ground cutting portion 6 is parallel to the sidewalk. As the angle A is changed, small portions of above ground cutting edge 5 may actually be below ground level; and small portions of below ground cutting edge 6 may be above ground.

FIG. 2 shows that cutting edge 4 can be continuous wherein there is not a clear line of demarcation between the above ground and below ground cutting portions. These portions vary depending upon the angle of orientation of the hoe with respect to the sidewalk.

FIG. 4 shows that a greater amount of demarcation between above ground portion 5 and below ground portion 6 may be employed.

FIG. 5 shows that the cutting edge may be rounded.

The edger-trimmer can be fabricated from sheet metal of any desired composition and thickness. Preferably, the edger-trimmer is fabricated and tempered to the approximate thickness and quality of the metal used in the hoe blade.

As discussed above, a one-piece edger-trimmer can be attached to the hoe blade 11 by removable clamping means. A removable clamp can be placed over the top edge of the hoe and tightened so as to sandwich the one-piece edger-trimmer between the hoe blade and the clamp.

What is claimed is:

1. A sidewalk edger and lawn trimmer implement, comprising:
    a one-piece edger and trimmer having a vertical cutting blade portion with a cutting edge; also having an obliquely downwardly and forwardly angled extension portion formed integrally with said edger and trimmer adjacent and generally perpendicular to said vertical portion, said obliquely angled portion providing a groove maker and a hoe attachment portion;
    a hoe means having a horizontal edge means for scraping the top surface of the sidewalk and for providing variable control of said vertical portion and said groove maker; and
    means connecting said one-piece edger trimmer to said hoe.

2. A sidewalk edger and lawn trimmer implement as described in claim 1 wherein said vertical cutting blade portion has an above ground cutting edge forward of a below ground cutting edge.

3. A sidewalk edger and lawn trimmer implement as described in claim 1 wherein said connecting means are clamping means.

4. A one-piece sidewalk edger and lawn trimmer attachment for a hoe, comprising:
    a vertical cutting blade portion with a cutting edge; and
    an obliquely downwardly and forwardly angled extension portion adjacent to and generally perpendicular to said vertical portion, said obliquely angled portion providing a groove maker and a hoe attachment portion.

5. A one-piece sidewalk edger and lawn trimmer attachment for a hoe as described in claim 4 wherein said attachment is attached to a hoe by clamping means.

6. A sidewalk edger and lawn trimmer, comprising:
    a handle; and
    a one-piece sidewalk edger, lawn trimmer, and hoe attached to said handle, wherein said edger-trimmer-hoe has a vertical cutting blade portion with a cutting edge; and has an obliquely downwardly and forwardly angled extension portion formed adjacent to and generally perpendicular to said vertical portion, said obliquely angled portion providing a groove maker and a hoe portion, wherein said hoe portion has a horizontal edge means for scraping the top surface of the sidewalk and for providing variable control of said vertical portion and said groove maker.

* * * * *